(12) United States Patent
Lee et al.

(10) Patent No.: US 10,078,386 B2
(45) Date of Patent: Sep. 18, 2018

(54) TOUCH DEVICE

(71) Applicant: LG INNOTEK CO., LTD., Seoul (KR)

(72) Inventors: Dong Keon Lee, Seoul (KR); Ja Ram Kim, Seoul (KR); Dong Mug Seong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 39 days.

(21) Appl. No.: 15/127,260

(22) PCT Filed: Mar. 6, 2015

(86) PCT No.: PCT/KR2015/002160
§ 371 (c)(1),
(2) Date: Sep. 19, 2016

(87) PCT Pub. No.: WO2015/141966
PCT Pub. Date: Sep. 24, 2015

(65) Prior Publication Data
US 2017/0108960 A1  Apr. 20, 2017

(30) Foreign Application Priority Data

Mar. 17, 2014 (KR) .................. 10-2014-0031254

(51) Int. Cl.
*G06F 3/041* (2006.01)
*G06F 3/045* (2006.01)
(Continued)

(52) U.S. Cl.
CPC ............... *G06F 3/041* (2013.01); *B32B 7/12* (2013.01); *B32B 15/02* (2013.01);
(Continued)

(58) Field of Classification Search
CPC ......... G06F 3/044; G06F 3/041; G06F 3/0412
See application file for complete search history.

(56) References Cited

U.S. PATENT DOCUMENTS 9,007,315 B2    4/2015  Kim et al.
2010/0090981 A1 4/2010  Park et al.
(Continued)

FOREIGN PATENT DOCUMENTS

CN   103389822 A    11/2013
EP   2 679 388 A1    1/2014
(Continued)

OTHER PUBLICATIONS

International Search Report, issued in PCT/KR2015/002160 (PCT/ISA/210), dated Jun. 5, 2015.

*Primary Examiner* — Nan-Ying Yang
(74) *Attorney, Agent, or Firm* — Birch, Stewart, Kolasch & Birch, LLP

(57) ABSTRACT

A touch device according to the embodiment includes a display panel; and a touch panel disposed on the display panel and including a curved surface, wherein an air gap is formed between the display panel and the touch panel. Thus, erosion and defects of components caused by the moisture penetrating into the air gap can be prevented so that the touch device according to the embodiments can improve the durability and the reliability.

6 Claims, 8 Drawing Sheets

(51) Int. Cl.
  *B32B 7/12*  (2006.01)
  *B32B 15/02*  (2006.01)
  *G06F 3/044*  (2006.01)

(52) U.S. Cl.
  CPC ... *B32B 2307/202* (2013.01); *B32B 2307/412* (2013.01); *B32B 2457/208* (2013.01); *G06F 3/044* (2013.01); *G06F 2203/04102* (2013.01); *G06F 2203/04112* (2013.01)

(56) References Cited

U.S. PATENT DOCUMENTS

| | | |
|---|---|---|
| 2010/0103138 A1 | 4/2010 | Huang et al. |
| 2011/0273383 A1 | 11/2011 | Jeon et al. |
| 2012/0081874 A1* | 4/2012 | Wu ............... G02F 1/1333 361/807 |
| 2012/0111479 A1* | 5/2012 | Sung ............ B32B 17/10036 156/102 |
| 2013/0127776 A1 | 5/2013 | Guard et al. |
| 2013/0234977 A1* | 9/2013 | Lin ................ G06F 3/044 345/174 |
| 2014/0002973 A1 | 1/2014 | Lee et al. |
| 2014/0092346 A1* | 4/2014 | Yang ........... G02F 1/133308 349/84 |
| 2015/0022475 A1* | 1/2015 | Watanabe ........ G06F 3/041 345/173 |

FOREIGN PATENT DOCUMENTS

| | | |
|---|---|---|
| KR | 10-2010-0041450 A | 4/2010 |
| KR | 10-2011-0123987 A | 11/2011 |

\* cited by examiner

[Fig. 1]
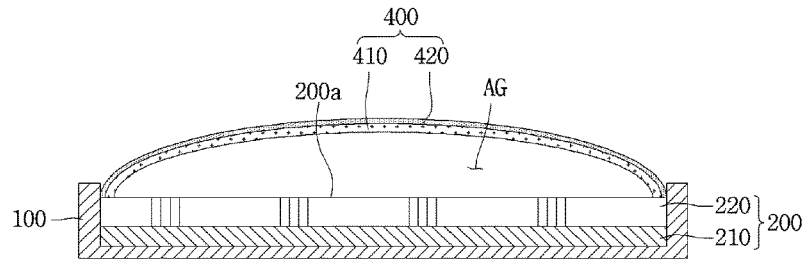
[Fig. 2]
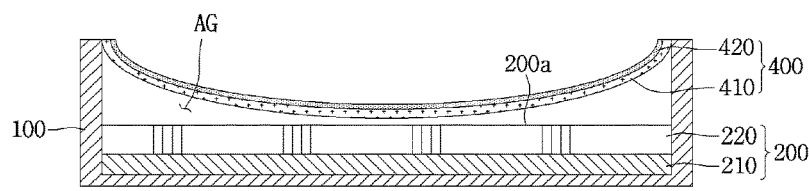
[Fig. 3]
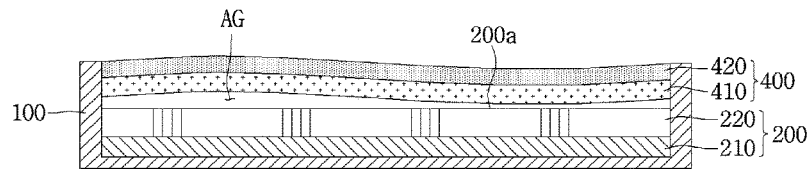
[Fig. 4]
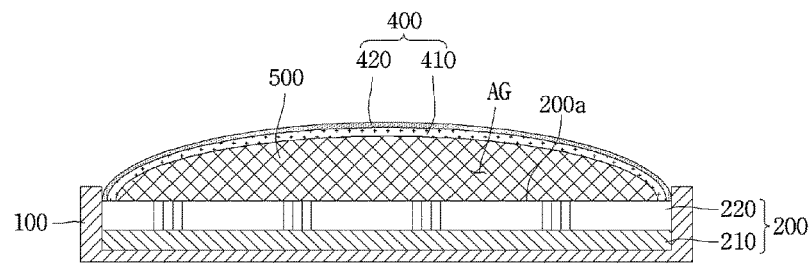
[Fig. 5]
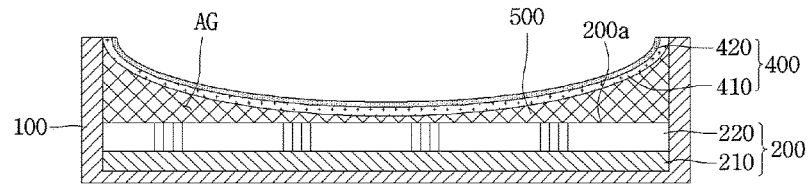
[Fig. 6]
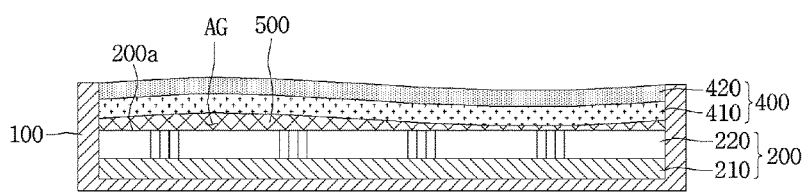

[Fig. 7]
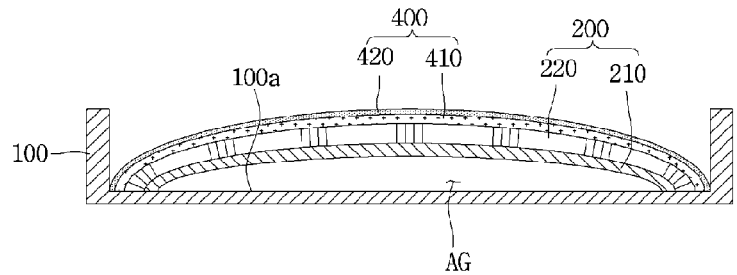
[Fig. 8]
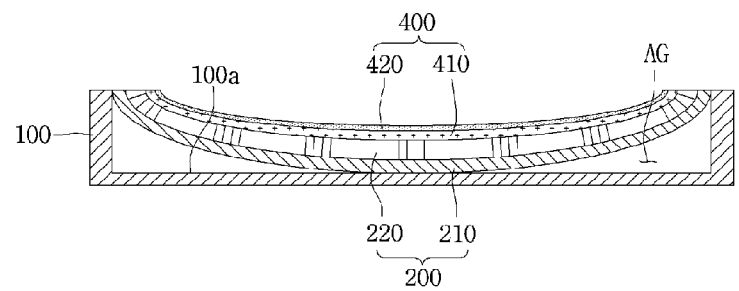
[Fig. 9]
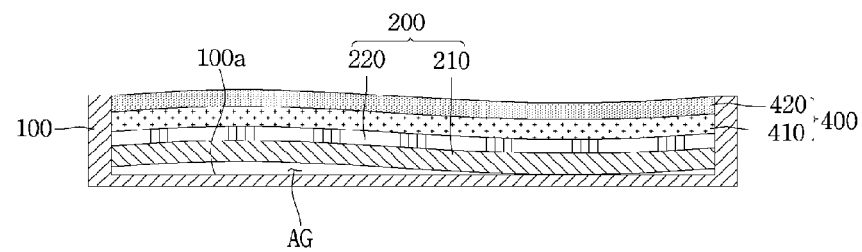
[Fig. 10]
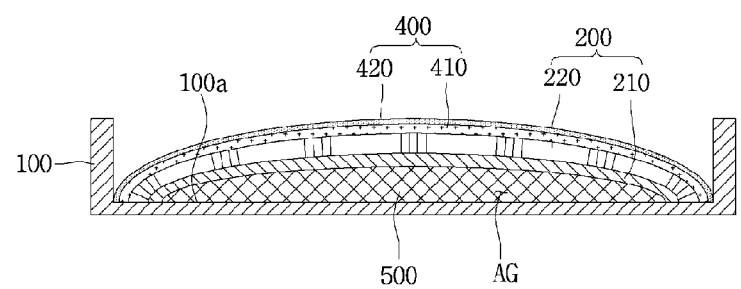
[Fig. 11]
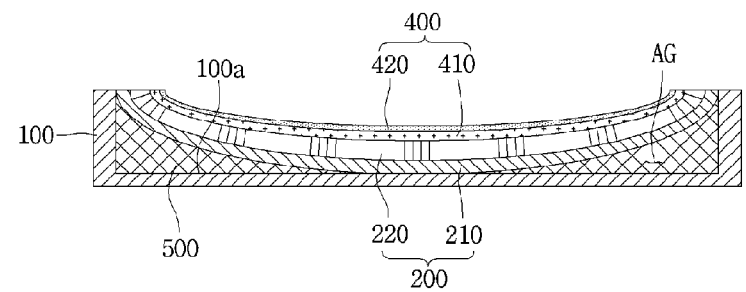

[Fig. 12]
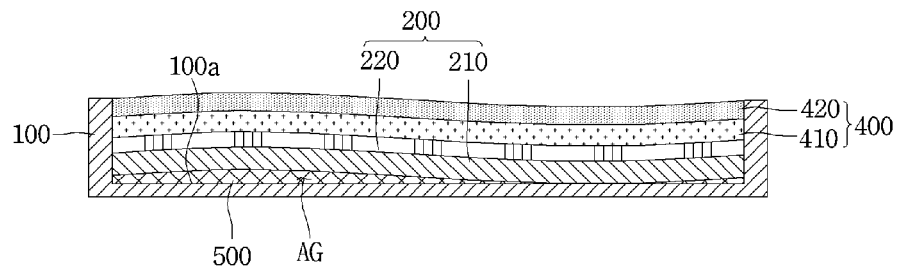
[Fig. 13]
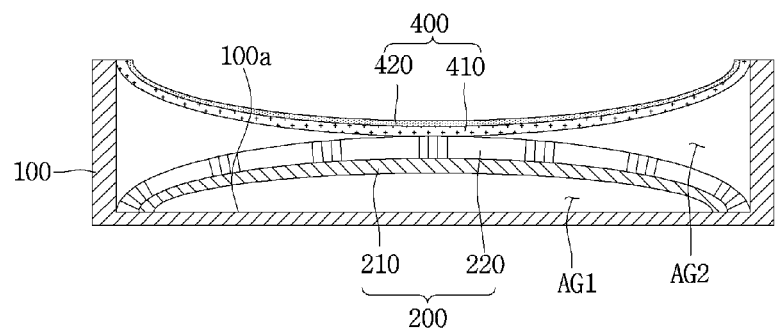
[Fig. 14]
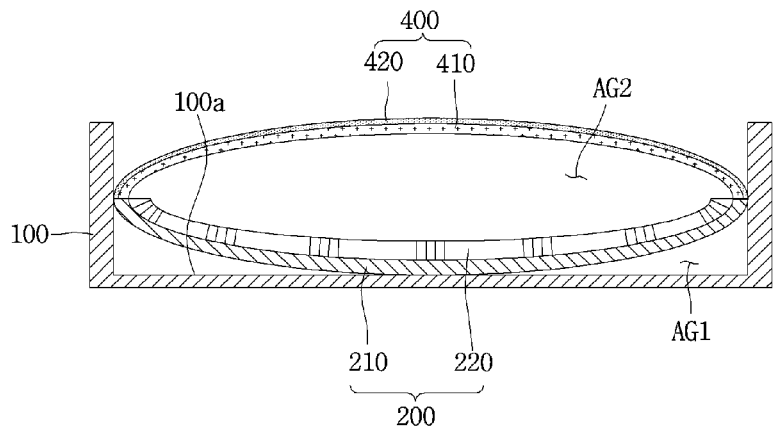
[Fig. 15]
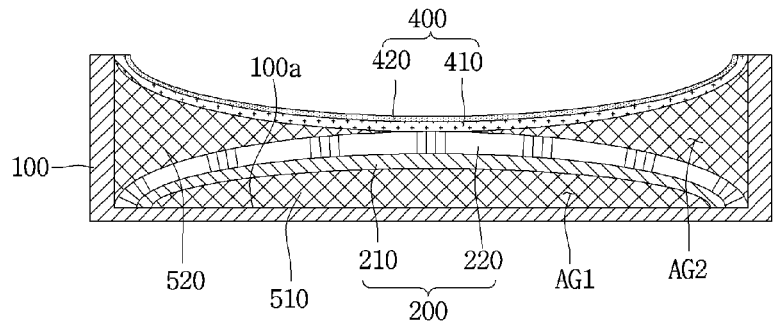

[Fig. 16]
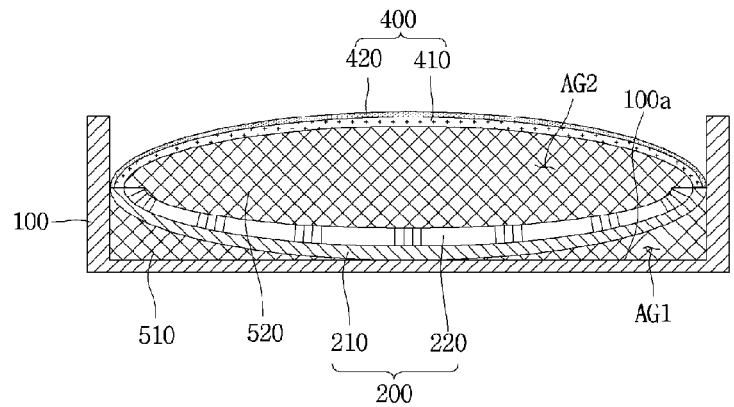
[Fig. 17]
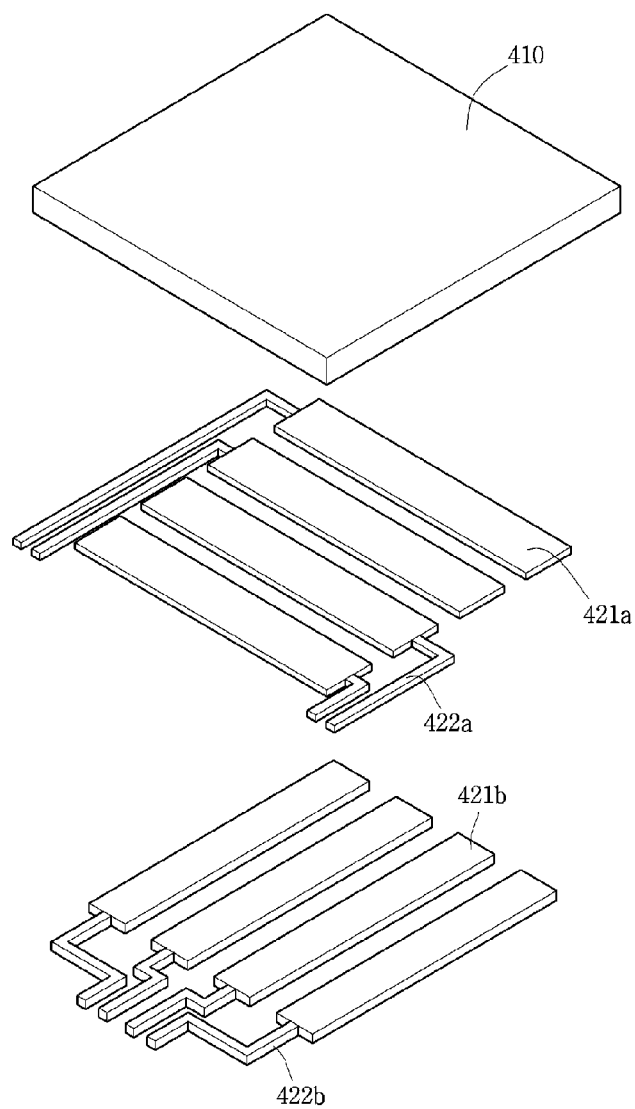

[Fig. 18]
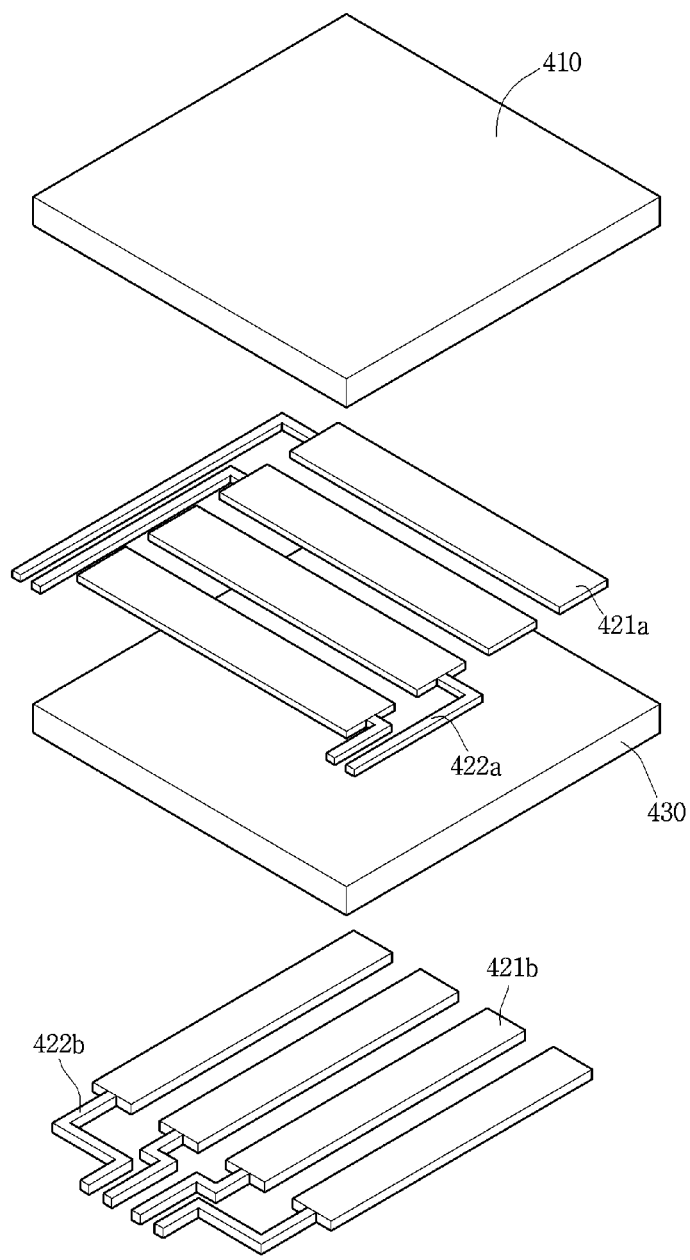

[Fig. 19]
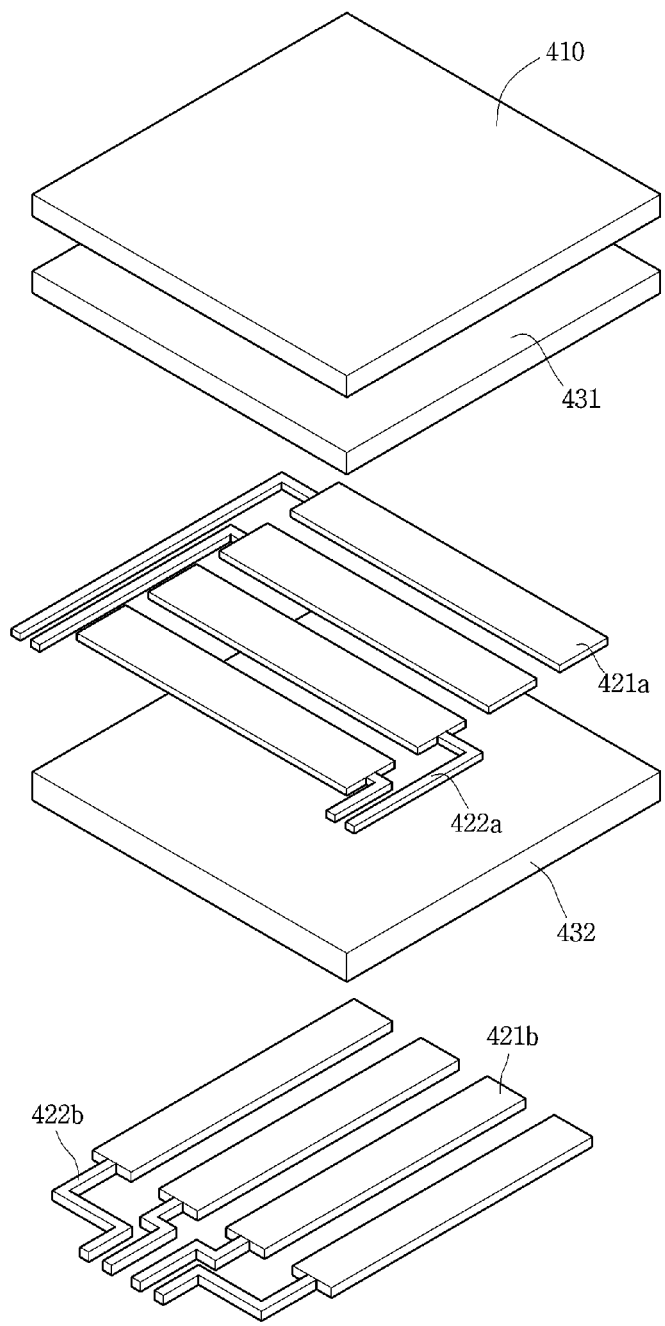

[Fig. 20]
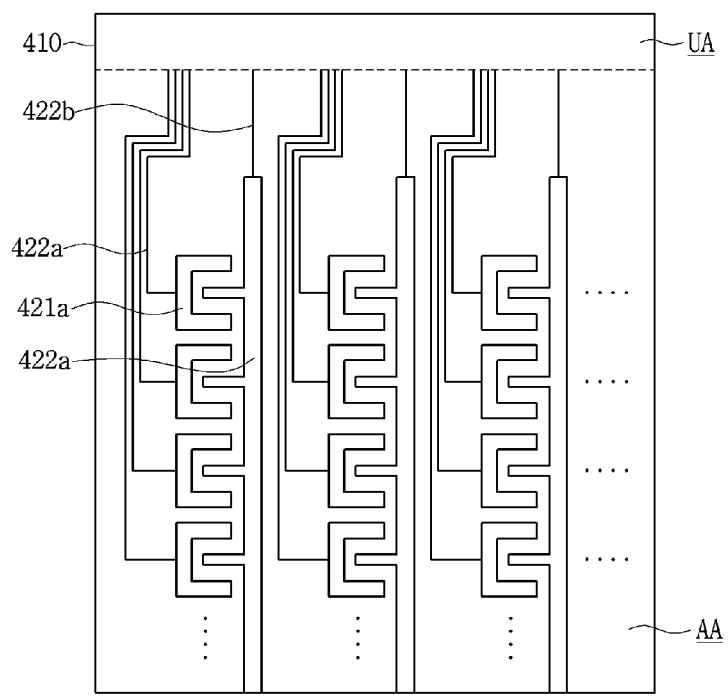
[Fig. 21]
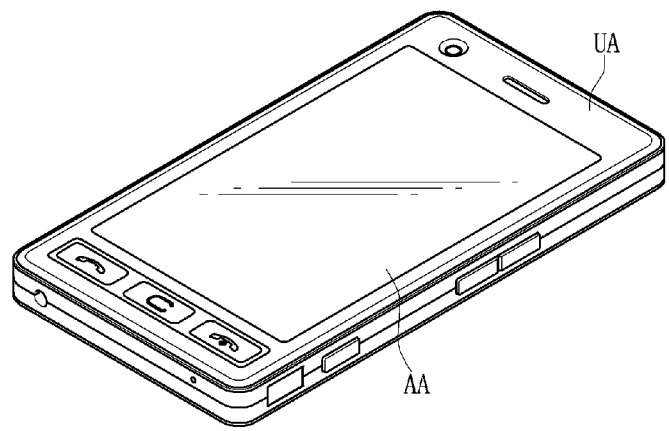

[Fig. 22]
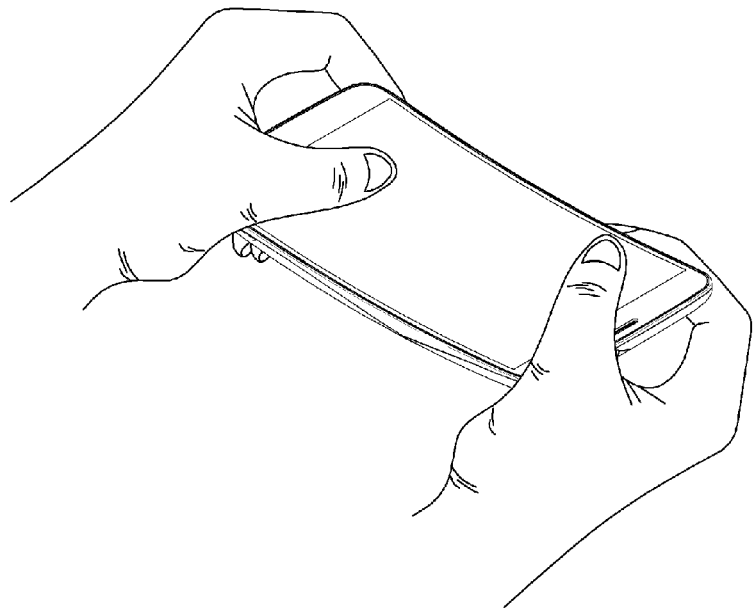
[Fig. 23]
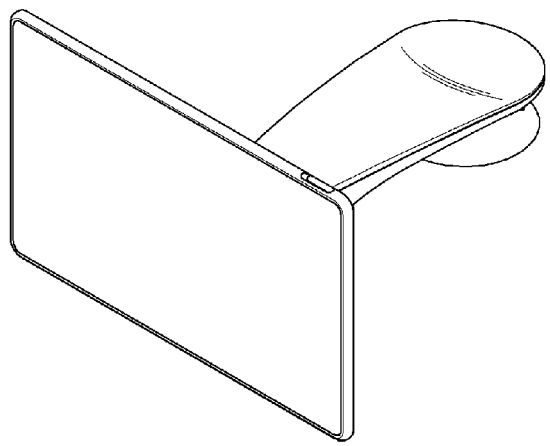
[Fig. 24]

TOUCH DEVICE

CROSS REFERENCE TO RELATED APPLICATIONS

This application is the National Phase of PCT International Application No. PCT/KR2015/002160, filed on Mar. 6, 2015, which claims priority under 35 U.S.C. 119(a) to Patent Application No. 10-2014-0031254, filed in Republic of Korea on Mar. 17, 2014, all of which are hereby expressly incorporated by reference into the present application.

TECHNICAL FIELD

The embodiment relates to a touch device.

BACKGROUND ART

Recently, a touch panel, which performs an input function through the touch to an image displayed on a touch device by an input device, such as a stylus pen or a hand, has been applied to various electronic appliances.

The touch panel may be typically classified into a resistive touch panel and a capacitive touch panel. In the resistive touch panel, the position of the touch point is detected by detecting the variation of resistance according to the connection between electrodes when pressure is applied to an input device. In the capacitive touch panel, the position of the touch point is detected by detecting the variation in capacitance between electrodes when a finger of the user touches the capacitive touch panel. When taking into consideration the convenience of a fabrication scheme and a sensing power, the capacitive touch panel has been recently spotlighted in a small-size touch panel.

Meanwhile, the demand for a flexible touch panel has been increased recently. In particular, a curved touch panel, other than a planar touch panel, is variously employed in a display device used for a vehicle, so the demand for the curved touch panel has been increased.

Such a curved touch panel may be combined with various components of an LCD and can be used in various technical fields, such as a vehicle. However, the curved touch panel may not be readily combined with various components of the vehicle.

Therefore, a touch device having a novel structure employing a curved touch panel capable of solving the above problem is required.

DISCLOSURE OF INVENTION

Technical Problem

The embodiment provides a curved touch device capable of improving the degree of freedom in design while enhancing reliability.

Solution to Problem

A touch device according to the embodiment includes a display panel; and a touch panel disposed on the display panel and including a curved surface, wherein an air gap is formed between the display panel and the touch panel.

Advantageous Effects of Invention

The touch device according to the embodiment employs a touch panel having a curved surface and/or a display panel having a curved surface, so the touch device may have a curved external appearance.

Therefore, the touch device according to the embodiments can be used for various fields such as a vehicle having curved surfaces. That is, the touch device according to the embodiments can be used in a planar surface and a curved surface regardless of the shape of coupling surfaces.

In addition, the touch device according to the embodiments can cover an air gap formed between the touch panel and the display panel by using a transparent reinforcing member, so impurities, such as moisture, can be prevented from penetrating into the air gap.

Thus, erosion and defects of components caused by the moisture penetrating into the air gap can be prevented so the touch device according to the embodiments can improve the durability and the reliability.

BRIEF DESCRIPTION OF DRAWINGS

FIGS. 1 to 3 are various sectional views of a touch device according to the first embodiment.

FIGS. 4 to 6 are various sectional views of a touch device according to the second embodiment.

FIGS. 7 to 9 are various sectional views of a touch device according to the third embodiment.

FIGS. 10 to 12 are various sectional views of a touch device according to the fourth embodiment.

FIGS. 13 and 14 are various sectional views of a touch device according to the fifth embodiment.

FIGS. 15 and 16 are various sectional views of a touch device according to the sixth embodiment.

FIGS. 17 to 20 are views showing various touch panels employed in a touch device according to the embodiment.

FIGS. 21 to 24 are views showing examples of display devices employing a touch device according to the embodiments.

MODE FOR THE INVENTION

In the description of the embodiments, it will be understood that, when a substrate, a layer (or film), a region, a pad or a pattern is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, embodiments will be described in detail with reference to accompanying drawings.

A touch device according to first and second embodiments will be described with reference to FIGS. 1 to 6.

Referring to FIGS. 1 to 3, the touch device according to the first embodiment may include a cover case 100, a display panel 200 and a touch panel 400.

The cover case 100 may receive the display panel 200 and the touch panel 400 therein. The cover case 100 may include metal or plastic.

Although the cover case 100 is illustrated as a rectangular shape in the drawings, this is illustrative purpose only. According to the embodiment, the cover case 100 may have a curved surface adapted for a vehicle.

The display panel 200 may include a light module 210 and a liquid crystal panel 220. The light module 210 may include a light source for emitting light toward the liquid crystal panel 220. For instance, the light source may include a light emitting diode (LED) or an organic light emitting diode (OLED).

The liquid crystal panel 220 may include a plurality of liquid crystal elements. The alignment of molecules in the liquid crystal elements may vary as an electrical signal is applied thereto from the outside so that the liquid crystal elements may have directionality of a predetermined pattern, respectively.

In the display panel 200, lights emitted from the light module 210 may be refracted to have mutually different patterns as the lights pass through the liquid crystal panel 220.

In addition, although not shown in the drawings, the display panel 200 may have a polarizing filter and a color filter disposed on the liquid crystal panel 220.

The touch panel 400 may be displayed on the display panel 200. In detail, the touch panel 400 is received in the cover case 100 on the display panel 200. The touch panel 300 may be bonded to the display panel 200. In detail, the touch panel 300 may be bonded to the display panel 200 by optical clear adhesive (OCA).

The touch panel 400 may have a cover substrate 410 and an electrode member 420.

The cover substrate 410 may be rigid or flexible. For example, the cover substrate 410 may include glass or plastic.

In detail, the cover substrate 410 may include chemically tempered/semi-tempered glass, such as soda lime glass or aluminosilicate glass, reinforced or flexible plastic, such as polyimide (PI), polyethylene terephthalate (PET), propylene glycol (PPG) or polycarbonate (PC), or sapphire.

In addition, the cover substrate 410 may include an optical isotropic film. For example, the cover substrate 410 may include cyclic olefin copolymer (COC), cyclic olefin polymer (COP), optical isotropic polycarbonate (PC), or optical isotropic polymethyl methacrylate (PMMA).

The sapphire has superior electric characteristics, such as permittivity, so that a touch response speed may be greatly increased and a space touch such as hovering may be easily implemented. In addition since the sapphire has a high surface hardness, the sapphire is applicable to a cover substrate. The hovering signifies a technique for recognizing a coordinate even in a position spaced apart from a display by a short distance.

In addition, the cover substrate 410 may be partially bent to have a curved surface. That is, the cover substrate 410 may have a partial flat surface and a partial curved surface. In detail, an end of the cover substrate 410 may be bent to have a curved surface or may be bent or flexed to have a surface including a random curvature.

Further, the cover substrate 410 may include a flexible substrate having a flexible property.

In addition, the cover substrate 410 may be a curved substrate or a bended substrate. That is, the touch window having the substrate may be formed to have a flexible, curved or bended property. For this reason, the touch window according to the embodiment may be easily portable and may be variously changed in design.

The cover substrate 410 may have an active area AA and an unactive area UA defined therein.

An image may be displayed in the active area AA. The image is not displayed in the unactive area UA provided at a peripheral portion of the active area AA.

In addition, the position of an input device (e.g., finger) may be sensed in at least one of the active area AA and the unactive area UA. If the input device, such as a finger, touches the touch window, the variation of capacitance occurs in the part touched by the input device, and the touched part subject to the variation of the capacitance may be detected as a touch point.

In addition, the electrode member 420 may include a substrate as well as a sensing electrode and a wire electrode disposed on the substrate.

The sensing electrode or the wire electrode may include a transparent conductive material which allows electricity to flow therethrough without interfering with light transmission. For instance, the sensing electrode or the wire electrode may include metal oxide, such as indium tin oxide, indium zinc oxide, copper oxide, tin oxide, zinc oxide, or titanium oxide.

The sensing electrode or the wire electrode may include a nanowire, a photosensitive nanowire film, carbon nanotube (CNT), graphene, conductive polymer or a mixture thereof.

If a nano composite, such as a nano wire or CNT, is used, the sensing electrode or the wire electrode may have a black color. In this case, it is possible to control the color and the reflectivity while ensuring electric conductivity by controlling the content of nano powder.

In addition, the sensing electrode or the wire electrode may include various metals. For instance, the sensing electrode or the wire electrode may include at least one of Cr, Ni, Cu, Al, Ag, Mo, Au, Ti and an alloy thereof.

Further, at least one of the sensing electrode and the wire electrode may include a plurality of sub-electrodes which cross each other in the form of a mesh.

Since the sensing electrode or the wire electrode has a mesh shape, the pattern of the sensing electrode may not be viewed in the active area, for instance, in the display area. That is, the pattern of the sensing electrode or the wire electrode may not be viewed even when the sensing electrode or the wire electrode is formed of metal. In addition, resistance of the touch panel may be lowered even when the sensing electrode is employed in a large-size touch panel.

A deco layer may be disposed on the cover substrate 410. For example, an outer dummy pattern may be disposed on the unactive area UA of the deco layer. The outer dummy layer may be formed by coating a material having a predetermined color such that a wire disposed on the unactive area and a printed circuit board connecting the wire to an external circuit may not be viewed from the outside.

The outer dummy layer may have a color suitable for an external appearance thereof. For instance, the outer dummy layer may include black or white pigment to represent a black color or a white color. In addition, desired logos may be formed on the outer dummy layer in various schemes. The outer dummy layer may be formed through deposition, printing or wet coating.

The outer dummy layer may include at least one layer. For instance, the outer dummy layer may include a single layer or at least two layers having widths different from each other.

In addition, the outer dummy layer may be formed of a film. Thus, when the outer dummy layer is disposed on a substrate having a flexibility or a curved surface, the outer dummy layer may be readily disposed on the substrate.

Further, the substrate may include a material which is similar to or the same as a material constituting the cover substrate described above.

The electrode member 420 may include one or two substrates, and the sensing electrode or the wire electrode may be disposed on each substrate. However, the embodiment is not limited to the above. For instance, the electrode member can be omitted and the electrode may be directly disposed on the cover window.

The cover substrate 410 and the electrode member 420 may be bonded to each other by a transparent adhesive, such as OCA (optical clear adhesive) or OCR (optical clear resin).

The touch panel 400 may have a curved surface. In detail, the touch panel 400 having a curved surface may be disposed on the display panel.

The touch panel 400 may have various curved surfaces. In detail, as shown in FIG. 1, the touch panel 400 may have a convex surface with respect to one surface 200a of the display panel 200. In addition, as shown in FIG. 2, the touch panel 400 may have a concave surface with respect to one surface 200a of the display panel 200. Further, as shown in FIG. 3, the touch panel 400 may have a convex surface and a concave surface with respect to one surface 200a of the display panel 200.

Since the touch panel 400 has at least one of the convex surface and concave surface with respect to one surface 200a of the display panel 200, an air gap AG may be formed between the touch panel 400 and the display panel 200 due to the curved surfaces.

The touch panel 400 may include a curved surface having a predetermined radius of curvature. In detail, the touch panel 400 may have a radius of curvature in the range of about 300 mm to about 1000 mm.

If the touch panel 400 has a radius of curvature less than about 300 mm, the touch panel 400 may be greatly bent with respect to the display panel. In this case, the light emitted from the display panel 200 may not be emitted through a front surface of the touch panel 400, so that the optical property may be degraded. In addition, if the touch panel 400 has a radius of curvature above about 1000 mm, the touch panel 400 may be almost planarized, so that the effect of the curved touch device may be degraded.

In the touch device according to the first embodiment, the touch panel having a concave surface or a convex surface may be disposed with respect to the display panel. Thus, the degree of freedom may be improved when designing the touch device including the touch panel having the curved surface. That is, when the touch device including the touch panel having the curved surface is coupled or attached to a structure, such as a vehicle, the touch device can be readily coupled to the structure regardless of the shape of the coupling surface of the structure to which the touch device having the curved surface is coupled.

Referring to FIGS. 4 to 6, a touch panel according to the second embodiment may further include a reinforcing member.

In detail, as shown in FIGS. 4 to 6, since the touch panel 400 includes at least one of the concave surface and the convex surface with respect to one surface 200a of the display panel 200, an air gap AG may be formed between the touch panel 400 and the display panel 200 due to the curved surfaces. The reinforcing member 500 may be disposed in the air gap AG. That is, the reinforcing member 500 may be filled in the air gap AG.

The reinforcing member 500 may be transparent. For example, the reinforcing member 500 may include at least one of an air layer, an adhesive layer and a plastic layer. In detail, the reinforcing member 500 may include an air layer including air, a resin layer including optical clear resin (OCR), photosensitive resin, polymethyl methacrylate (PMMA) or polycarbonate, and an adhesive layer including optical clear adhesive (OCA).

The reinforcing member 500 is filled in the air gap AG so that the air gap is fully filled with the reinforcing member 500. Thus, the reinforcing member 500 may come into contact with one surface of the touch panel 400 and one surface of the display panel 200.

The touch device according to the second embodiment can improve the degree of freedom in design while enhancing reliability. That is, impurities, which may penetrate into the air gap from the outside, can be blocked by the reinforcing member, so that the reliability of the touch device can be improved.

Hereinafter, the touch device according to the third and fourth embodiments will be described in detail with reference to FIGS. 7 to 12. In the following description of the touch device according to the third and fourth embodiments, description about elements and structures the same as or similar to those of the touch device according to the first and second embodiments will be omitted. In addition, the same reference numerals will be assigned to the elements the same as those of the first and second embodiments.

Referring to FIGS. 7 to 9, the touch device according to the third embodiment may include a cover case 100, a display panel 200 having a curved surface and a touch panel 400 having a curved surface.

The display panel 200 may be accommodated in the cover case 100. In addition, the display panel 200 may have the curved surface in a predetermined direction.

Further, the touch panel 400 may be disposed on the display panel 200. In addition, the touch panel 400 may have the curved surface.

The touch panel 400 and the display panel 200 may have various curved surfaces. In detail, as shown in FIG. 7, the touch panel 400 and the display panel 200 may have a convex surface with respect to a receiving surface 100a of the cover case 100. In addition, as shown in FIG. 8, the touch panel 400 and the display panel 200 may have a concave surface with respect to the receiving surface 100a of the cover case 100. Further, as shown in FIG. 9, the touch panel 400 and the display panel 200 may have a convex surface and a concave surface with respect to the receiving surface 100a of the cover case 100.

Since the touch panel 400 and the display panel 200 have at least one of the convex surface and concave surface with respect to the top surface of the cover case 100, an air gap AG may be formed between the display panel 200 and the cover case 100 due to the curved surfaces.

The curved surface of the touch panel 400 may be the same as or similar to the curved surface of the display panel 200. In addition, the curved surface of the touch panel 400 may have a radius of curvature the same as or similar to a radius of curvature of the curved surface of the display panel 200. Further, the curved surface of the touch panel 400 may have a radius of curvature different from a radius of curvature of the curved surface of the display panel 200.

In detail, the touch panel 400 and the display panel 200 may have the radius of curvature in the range of about 300 mm to about 1000 mm. The radius of curvature of the touch panel 400 may be identical to, similar to or different from the radius of curvature of the display panel 200 within the above range.

If the touch panel 400 and the display panel 200 have a radius of curvature less than about 300 mm, the optical property of the touch device may be degraded. In addition, if the touch panel 400 and the display panel 200 have a radius of curvature above about 1000 mm, the touch panel 400 and the display panel 200 may be almost planarized, so that the effect of the curved touch device may be degraded.

In the touch device according to the third embodiment, the touch panel and the display panel having a concave surface or a convex surface may be disposed with respect to the receiving surface of the cover case. Thus, the degree of freedom may be improved when designing the touch device including the touch panel having the curved surface. That is, when the touch device including the touch panel having the curved surface is coupled or attached to a structure, such as a vehicle, the touch device can be readily coupled to the structure regardless of the shape of the coupling surface of the structure to which the touch device having the curved surface is coupled.

The touch panel according to the fourth embodiment may further include a reinforcing member.

In detail, as shown in FIGS. 10 to 12, since the touch panel 400 and the display panel 200 include at least one of the concave surface and the convex surface with respect to the receiving surface 100a of the cover case 100, an air gap AG may be formed between the display panel 200 and the cover case 100 due to the curved surfaces. The reinforcing member 500 may be disposed in the air gap AG.

The reinforcing member 500 may be transparent. For example, the reinforcing member 500 may include at least one of an air layer, an adhesive layer and a plastic layer.

The reinforcing member 500 is filled in the air gap AG so that the air gap is fully filled with the reinforcing member 500. Thus, the reinforcing member 500 may come into contact with one surface of the display panel 200 and one surface of the cover case 100.

The touch device according to the fourth embodiment can improve the degree of freedom in design while enhancing reliability. That is, impurities, which may penetrate into the air gap from the outside, can be blocked by the reinforcing member, so that the reliability of the touch device can be improved.

Hereinafter, the touch device according to the fifth and sixth embodiments will be described in detail with reference to FIGS. 13 to 16. In the following description of the touch device according to the fifth and sixth embodiments, description about elements and structures the same as or similar to those of the touch device according to the first to fourth embodiments will be omitted. In addition, the same reference numerals will be assigned to the elements the same as those of the first to fourth embodiments.

Referring to FIGS. 13 and 14, the touch device according to the fifth embodiment may include a cover case 100, a display panel 200 having a curved surface and a touch panel 400 having a curved surface.

The display panel 200 may be accommodated in the cover case 100. In addition, the display panel 200 may have the curved surface in a predetermined direction.

Further, the touch panel 400 may be disposed on the display panel 200. In addition, the touch panel 400 may have the curved surface.

The display panel 200 and the touch panel 400 may have the curved surfaces in the different directions.

In detail, as shown in FIG. 13, the display panel 200 may have a convex surface with respect to the receiving surface 100a of the cover case 100 and the touch panel 400 may have a concave surface with respect to the receiving surface 100a of the cover case 100. In addition, as shown in FIG. 14, the display panel 200 may have a concave surface with respect to the receiving surface 100a of the cover case 100 and the touch panel 400 may have a convex surface with respect to the receiving surface 100a of the cover case 100.

Since the touch panel 400 and the display panel 200 have at least one of the convex surface and concave surface with respect to one surface of the cover case 100, an air gap AG may be formed between the display panel 200 and the cover case 100 due to the curved surfaces.

The curved surface of the touch panel 400 may have a radius of curvature the same as or similar to a radius of curvature of the curved surface of the display panel 200. Further, the curved surface of the touch panel 400 may have a radius of curvature different from a radius of curvature of the curved surface of the display panel 200.

In detail, the touch panel 400 and the display panel 200 may have the radius of curvature in the range of about 300 mm to about 1000 mm. The radius of curvature of the touch panel 400 may be identical to, similar to or different from the radius of curvature of the display panel 200 within the above range.

If the touch panel 400 and the display panel 200 have a radius of curvature less than about 300 mm, the optical property of the touch device may be degraded. In addition, if the touch panel 400 and the display panel 200 have a radius of curvature above about 1000 mm, the touch panel 400 and the display panel 200 may be almost planarized, so that the effect of the curved touch device may be degraded.

The air gap AG may include a first air gap AG1 and a second air gap AG2. In detail, the air gap AG may include the first air gap AG1 formed between the cover case 100 and the display panel 200 and the second air gap AG2 formed between the display panel 200 and the touch panel 400.

Referring to FIGS. 15 and 16, the touch panel according to the sixth embodiment may include a reinforcing member 500 disposed in the air gap AG. In detail, a first reinforcing member 510 may be disposed in the first air gap AG1 and a second reinforcing member 520 may be disposed in the second air gap AG2.

The first and second reinforcing members 510 and 520 may be transparent. For example, the first and second reinforcing members 510 and 520 may include at least one of an air layer, an adhesive layer and a plastic layer. In detail, the reinforcing member 500 may include an air layer including air, a resin layer including optical clear resin (OCR), photosensitive resin, polymethyl methacrylate (PMMA) or polycarbonate, and an adhesive layer including optical clear adhesive (OCA).

The first and second reinforcing members 510 and 520 may include the same or similar material or different materials from among the above transparent materials.

The first and second reinforcing members 510 and 520 may be filled in the first and second air gaps AG1 and AG2, respectively, so that the first and second air gaps AG1 and AG2 are fully filled with the first and second reinforcing members 510 and 520, respectively.

Thus, the first reinforcing member 510 may come into contact with the cover case 100 and the display panel 200 and the second reinforcing member 520 may come into contact with the display panel 200 and the touch panel 400.

The touch device according to the embodiments employs the touch panel having the curved surface and/or the display panel having the curved surface, so the touch device may have a curved external appearance.

Therefore, the touch device according to the embodiments can be used for various fields such as a vehicle having curved surfaces. That is, the touch device according to the embodiments can be used in a planar surface and a curved surface regardless of the shape of coupling surfaces of the structure to which the touch device is coupled.

In addition, the touch device according to the embodiments can cover the air gap formed between the touch panel and the display panel by using a transparent reinforcing member, so impurities, such as moisture, can be prevented from penetrating into the air gap.

Thus, erosion and defects of components caused by the moisture penetrating into the air gap can be prevented so the touch device according to the embodiments can improve the durability and the reliability.

Hereinafter, various types of touch panels employed in the touch device according to the embodiment will be described with reference to FIGS. 17 to 19.

Referring to FIG. 17, the touch panel according to the embodiment may include a cover substrate 410 and an electrode layer formed on the cover substrate 410.

In detail, a first sensing electrode 421a and a second sensing electrode 421b, which extend in mutually different directions, may be disposed on the cover substrate 410.

The first sensing electrode 421a and the second sensing electrode 421b may be disposed on the same plane of the cover substrate 410. In addition, a first wire electrode 422a may be connected to the first sensing electrode 421a and a second wire electrode 422b may be connected to the second sensing electrode 421b.

Referring to FIG. 18, the touch panel according to another embodiment may include a cover substrate 410, a substrate 430 and an electrode.

The first sensing electrode 421a and the first wire electrode 422a may be disposed on the cover substrate 410 and the second sensing electrode 421b and the second wire electrode 422b may be disposed on the substrate 430.

Alternately, the cover substrate 410 may be bonded to the substrate 430 by an adhesive layer, the first sensing electrode 421a and the first wire electrode 422a may be disposed on one surface of the substrate 430 and the second sensing electrode 421b and the second wire electrode 422b may be disposed on the other surface of the substrate 430.

Referring to FIG. 19, the touch panel according to another embodiment may include a cover substrate 410, a first substrate 431, a second substrate 432 and an electrode layer.

The cover substrate 410, the first substrate 431, and the second substrate 432 may be bonded with each other by an adhesive layer.

The first sensing electrode 421a and the first wire electrode 422a may be disposed on one surface of the first substrate 431 and the second sensing electrode 421b and the second wire electrode 422b may be disposed on the one surface of the second substrate 432.

Referring to FIG. 20, the touch panel of another type may include a substrate 420 as well as a first sensing electrode 421a and a second sensing electrode 421b formed on the substrate 420. A cover substrate may further disposed on the substrate 420. Alternately, the substrate 420 may serve as a cover substrate.

The first sensing electrode 421a and the second sensing electrode 421b may be disposed on the same plane of the substrate 420. For example, the first sensing electrode 421a and the second sensing electrode 421b may be spaced apart from each other on the same plane of the substrate 420.

In addition, a first wire electrode 422a may be connected to the first sensing electrode 421a and a second wire electrode 422b may be connected to the second sensing electrode 421b. The first wire electrode 422a may be disposed on the active area and the unactive area of the substrate 420 and the second wire electrode 422b may be disposed on the unactive area of the substrate 420.

Hereinafter, one example of a display device employing a touch device according to the embodiment will be described with reference to FIGS. 21 to 24.

Referring to FIG. 20, a mobile terminal is illustrated as an example of the display device. The mobile terminal may include the active area AA and the unactive area UA. The active area AA is a region in which a touch signal is sensed due to the touch by a finger, and an instruction icon pattern part and a logo may be formed in the unactive area UA.

Referring to FIG. 21, the touch device may include a flexible touch device which may be bent. Thus, the display device including the touch device may be a flexible display device. Therefore, a user may bend or flex the display device by using a hand.

Referring to FIG. 22, the touch device may be applied to a vehicle navigation system as well as the display device, such as a mobile terminal.

In addition, referring to FIG. 23, the touch device may be applied inside a vehicle. In other words, the touch device may be applied to various parts in the vehicle where the touch panel is applied. Accordingly, the touch device may be applied to a dashboard as well as a PND (Personal Navigation Display), thereby realizing a CID (Center Information Display). However, the embodiment is not limited thereto. In other words, the touch device may be used in various electronic products.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch device comprising:
   a cover case;
   a display panel disposed on the cover case and including a curved surface; and
   a touch panel disposed on the display panel and including a curved surface,
   wherein a first gap is formed between the cover case and the display panel and a second gap is formed between the display panel and the touch panel,
   wherein the first gap vertically overlaps the second gap,
   wherein the display panel comprises a concave surface with respect to a top surface of the cover case,
   wherein the touch panel comprises a convex surface with respect to the top surface of the cover case,
   wherein a size of the second gap is defined by a distance between a top surface of the display panel and a bottom surface of the touch panel, wherein the size of the second gap increases from a central region of the second gap to an outer region of the second gap, wherein the touch panel comprises a cover substrate and an electrode member, wherein the cover substrate and the electrode member are bonded to each other by an adhesive, wherein a first reinforcing member is disposed in the first gap and a second reinforcing member is disposed in the second gap, wherein the adhesive, the first reinforcing member and the second reinforcing member comprise a same material, wherein the electrode member comprises a sensing electrode on the cover substrate and a wire electrode on the cover substrate, wherein the sensing electrode comprises a first sensing electrode and a second sensing electrode which extend in mutually different directions, and wherein the first sensing electrode, the second sensing electrode and the wire electrode comprise a plurality of sub-electrodes which cross each other in the form of a metal mesh.

2. The touch device of claim 1, wherein the first and second reinforcing members comprise transparent reinforcing members and the transparent reinforcing members comprise at least one of an air layer, an adhesive layer and a plastic layer.

3. The touch device of claim 1, wherein a radius of curvature of the display panel is identical to or different from a radius of curvature of the touch panel.

4. The touch device of claim 1, wherein the touch panel has a radius of curvature in a range of 300 mm to 1000 mm.

5. The touch device of claim 1, wherein the display panel has a radius of curvature in a range of 300 mm to 1000 mm.

6. The touch device of claim 1, wherein the display panel and the touch panel each have a radius of curvature in a range of 300 mm to 1000 mm.

* * * * *